United States Patent
Deschamps

(10) Patent No.: US 7,103,203 B2
(45) Date of Patent: Sep. 5, 2006

(54) MEDICAL IMAGING STATION WITH A FUNCTION OF EXTRACTING A PATH WITHIN A RAMIFIED OBJECT

(75) Inventor: Thomas D. Deschamps, Bologne Billancourt (FR)

(73) Assignee: Koninklijke Philips Electronics, N.V., Eindhoven (NL)

( * ) Notice: Subject to any disclaimer, the term of this patent is extended or adjusted under 35 U.S.C. 154(b) by 682 days.

(21) Appl. No.: 10/281,693

(22) Filed: Oct. 28, 2002

(65) Prior Publication Data

US 2003/0083567 A1    May 1, 2003

(30) Foreign Application Priority Data

Oct. 30, 2001 (FR) .................................. 01 14048

(51) Int. Cl.
*G06K 9/00* (2006.01)

(52) U.S. Cl. .................. 382/128; 382/164; 382/171; 382/173; 128/922

(58) Field of Classification Search ........ 382/128–132, 382/154, 164, 171, 173, 180; 128/922
See application file for complete search history.

(56) References Cited

U.S. PATENT DOCUMENTS 6,501,848 B1 * 12/2002 Carroll et al. .............. 382/128
6,845,260 B1 *  1/2005 Liu et al. .................... 600/410

FOREIGN PATENT DOCUMENTS

EP         1058913       3/1999

OTHER PUBLICATIONS

Sethian, J.A., Level sets methods and fast marching methods, evolving interfaces in computational geometry, fluid mechanics, computer science and material science, 1999, Cambridge University Press, pp. 220-221.*

Akita, K. et al., A computer method of understanding ocular fundus images, vol. 15, No. 6, 1982, pp. 431-443, XP-002131982.*

Coquerez, S.P., et al, Analyse d'images: filtrage et segmentation, 1995, Masson. (Note that part of the applicant's specification is being used as an equivalent of this document as the applicant discussed it but did not furnish copies of relevant pages).*

(Continued)

*Primary Examiner*—Matthew C. Bella
*Assistant Examiner*—Manav Seth

(57) ABSTRACT

The invention relates to a medical imaging station including acquisition means ACQ for obtaining images IM exhibiting levels of gray, means DIS of displaying images IM, segmentation means SEG for segmenting at least one imaged object, said segmentation means SEG determining a so-called segmentation zone IMS delimiting the image object on the image, and means TR of extracting at least one path PAT within the segmentation IMS. The station according to the invention is such that the extraction means include means POS of positioning an initial point on the segmentation, means PROP of propagating an edge within the segmentation IMS from the initial point, means TES of testing the connectedness of the edge, means LAB of labeling portions of the edge, referred to as ramifications, when a non-connected edge is detected, means IDE of identifying final points PF of the propagation on the ramifications, path tracing means TRA for tracing a path PAT from final points PF and the initial point. Application: Medical imaging

8 Claims, 2 Drawing Sheets

OTHER PUBLICATIONS

Figure 1:
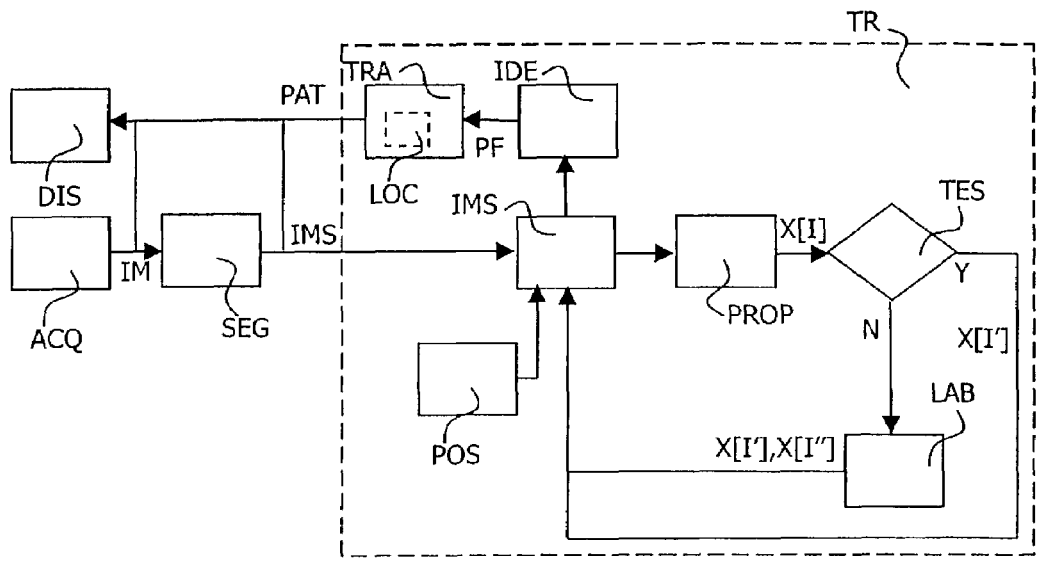

Deschamps et al: "Minimal Paths in 3D Images and Application to Virtual Endoscopy," Proc. 6th European on Computer Vision, ECCV, Dublin, Jun./Jul. 2000. In: Lecture Notes in Computer Science, vol. 1843, (2000), pp. 543-557.

* cited by examiner

MEDICAL IMAGING STATION WITH A FUNCTION OF EXTRACTING A PATH WITHIN A RAMIFIED OBJECT

The invention relates to a medical imaging station including acquisition means for obtaining images exhibiting levels of gray, display means for displaying the images, segmentation means for segmenting at least one imaged object, said segmentation means determining a so-called segmentation zone delimiting the imaged object on the image, and extraction means for extracting at least one path within the segmentation.

Many methods of acquiring medical images can supply images exhibiting levels of gray. Thus the invention can be used for images obtained by ultrasound, radiological or magnetic resonance techniques. It should be noted that the levels of gray can possibly be replaced in an equivalent fashion with levels of a particular color different from gray.

A medical station according to the introductory paragraph supplies a segmentation of the image which can be used by the path extraction means. The extraction of a path is particularly important for analyzing the image when slender objects are being observed: vessels, intestines etc.

Such a medical station can be produced by means of an image processing method as proposed in patent EP1058913. Such a method makes it possible in fact to trace a path within a central region defined from a structure having boundaries and depicted on an image. The central region is a segmentation of the image defined from characteristics of the image. The path traced within the segmentation is the shortest path between two final points defined as being the points furthest away within the central region. The technique proposed in the state of the art is very quick since it uses very fast algorithms.

The drawback of the state of the art lies in the fact that it makes it possible to extract a path between two points which are furthest away. When ramified objects are being imaged, the ramifications are neither detected nor traced. This is particularly detrimental in the case of vessels where it is very advantageous to have available a location of the forks. This is because the imaging station according to the state of the art does not make it possible to locate aneurysms nor to gain access to the path followed by the ramifications. It should also be noted that the techniques using peeling algorithms do however make it possible to observe the ramifications but their use is slow and it is then necessary to clean the ramifications in order to be able to analyze the structure of the ramifications themselves. This may cause errors during the cleaning of the ramifications and result in erroneous analyses of the imaged object.

One aim of the invention is to provide a medical imaging station including a fast path tracing device making it possible to take account of ramifications of the imaged object. Taking account of the ramifications is essential in the use of the imaging station for vessels in two or three dimensions.

In fact, a medical imaging station according to the introductory paragraph is characterized according to the invention in that the extraction means include:

means of positioning an initial point on the segmentation, means of propagating an edge within the segmentation from the initial point, means of testing the connectedness of the edge, means of labeling the portions of the edge, called ramifications, when an unconnected edge is detected, means of identifying final points of the propagation on the ramifications, path tracing means for tracing a path from the final points and the initial point.

The invention makes it possible to detect and locate the ramifications by detecting a loss of connectedness of an edge within the imaged object. From this detection, final points for the ramifications are identified. It is then possible to trace trajectories between two points according to the technique for example disclosed in the cited document of the state of the art. A minimum pathway can then for example be traced between each final point and the initial point. As the algorithms dealing with the propagation of an edge and the calculation of a minimum pathway are very fast, the invention makes it possible to obtain precise and rapid results.

In the particular case of vessels, it is advantageous to obtain a path for each ramification between the initial point and the final point. In another embodiment of the invention, a single ramified path is traced after a fork point localization and then, for example, a minimum pathway trace, as described in the document of the state of the art, between several points taken in pairs. This ramified path will have particular properties and will afford particular functions for the medical imaging station.

The invention also relates to a path extraction device intended to be used in a medical imaging station and a path extraction method intended to be implemented in a medical imaging station according to the invention. The use of a medical imaging station according to the invention makes it possible to obtain a trace of multiple paths or a ramified path trace very rapidly and precisely as soon as a segmentation is obtained for a ramified object. The display means can consequently display the path on an image or a segmentation shown in two or three dimensions and possibly the change in the trace during the propagation of the edge.

Figure 2:
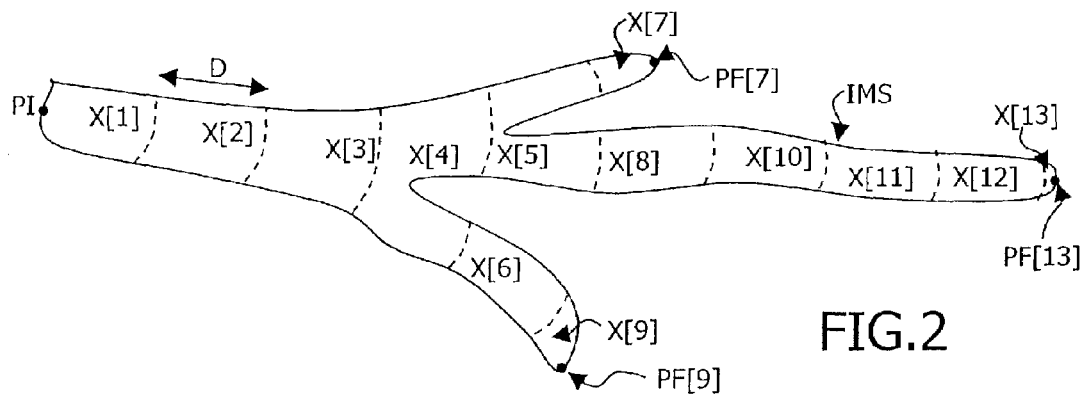
Figure 3:
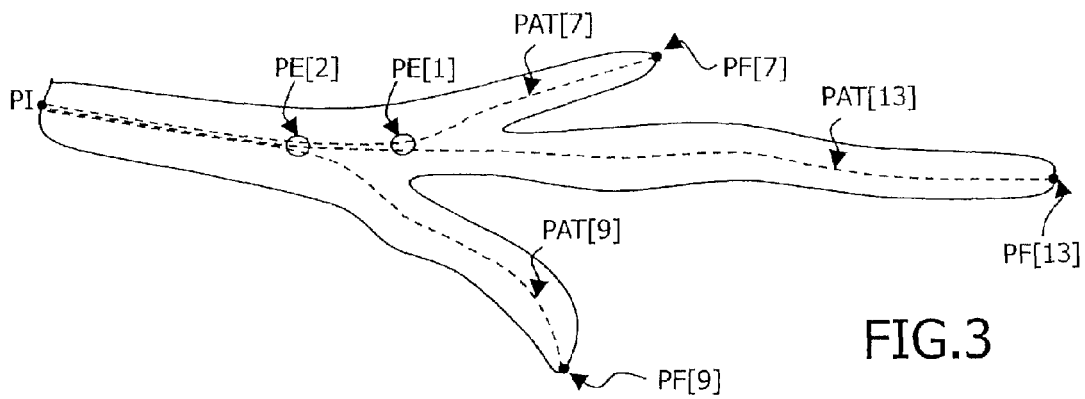
Figure 4:
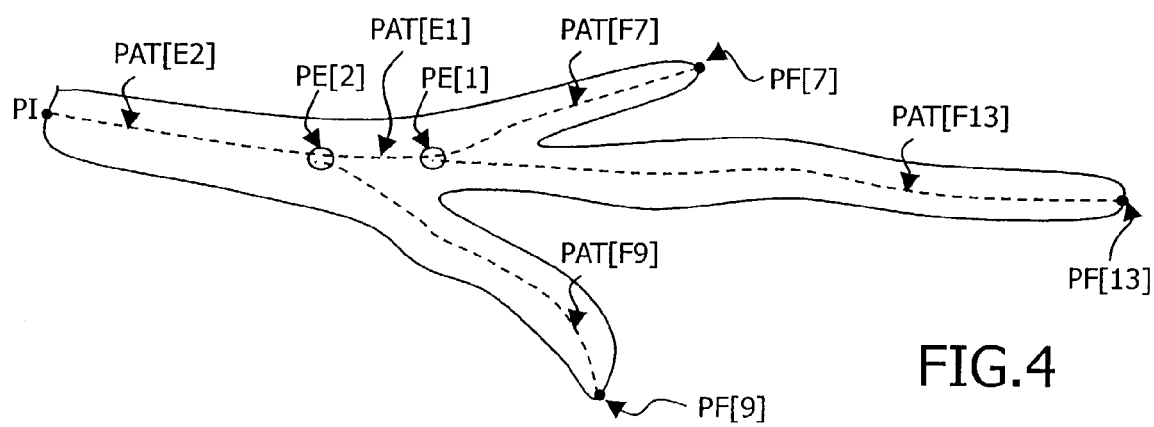

The invention will be better understood in the light of the following description of a few embodiments, given by way of non-limiting examples and with regard to the accompanying drawings, in which:

FIG. 1 depicts a schematic diagram of a medical imaging station and of a path extraction device according to the invention, FIG. 2 illustrates schematically the functioning of the means of testing connectedness, of labeling the detected ramifications and of identifying final points according to a preferred embodiment of the invention on an example of an imaged object, FIG. 3 illustrates schematically the functioning of the path tracing means and the means of determining the fork point according to the preferred embodiment of the invention, FIG. 4 illustrates schematically the functioning of the ramified path tracing means as disclosed in one advantageous embodiment.

Many acquisition methods can benefit from the invention in a medical imaging station according to the invention. Provided that an image and a segmentation of this image are obtained by means of the method used by the acquisition means of the medical imaging station, the medical station according to the invention is advantageously used. Thus images obtained by ultrasonic, radiological or magnetic resonance techniques can be dealt with by a medical imaging station according to the invention. The invention will be particularly advantageous for the processing of images depicting objects with ramifications: vessels etc.

FIG. 1 depicts a schematic diagram of a medical imaging station according to the invention. This station includes acquisition means ACQ for obtaining images IM, display means DIS for displaying the images IM, segmentation means SEG for supplying a segmentation IMS, the display means DIS being able to include also means of displaying, in two or three dimensions, a segmentation IMS of the image and possibly the change in the segmentation IMS, and means TR extracting at least one path PAT within the segmentation IMS. One aim of the invention is to provide a medical imaging station including path tracing means TR for taking account of ramifications of the imaged object. Taking account of the ramifications is essential in the use of the imaging station for vessels in two or three dimensions. The medical imaging station thus includes extraction means TR including means POS of positioning an initial point on the segmentation IMS, and means PROP of propagating an edge X within this segmentation IMS from the initial point. The propagation of the edge is illustrated in FIG. 2. In FIG. 2, an initial point PI is placed on the Figure by means of point positioning means POS. The edge X propagates gradually according for example to the propagations proposed in the Fast Marching algorithms in the book: "Level sets methods and fast-marching methods, evolving interfaces in computational geometry, fluid mechanics, computer science and material science" by J. A. Sethian, published by Cambridge University Press, 1999. According to the descriptions of the state of the art, the speed of propagation depends on the level of gray at each point of the segmentation IMS, referred to as the current point, when the points possess levels of gray. In all cases, the propagation can take place only within the segmentation IMS. Generally, the segmentation is in fact a binary image: points of the image belong to a zone, the segmentation, and the other points do not belong to this zone. The points of the segmentation can keep their inherent characteristics or have characteristics made uniform over the segmentation. Outside the segmentation, the characteristics of the points can be such that the edge cannot propagate on these points. Generally an infinite or zero value is then associated with these points. A segmentation can advantageously be such that, inside, all the points have the same characteristics. For example, the characteristics used in calculating the speed of propagation of the edge (levels of gray in our case) can be uniform over all the segmentation and be different outside (for example infinite or zero), preventing the edge from leaving the segmentation. The propagation equations and the details relating to this edge propagation are accessible to persons skilled in the art in the book by Sethian. Advantageously the propagation is effected using algorithms of the shortest pathway type, which seek the least expensive pathway between the possible pathways for the propagation of an edge. The propagation is continuous and takes place in all directions. However, when there is a segmentation of the image which has already been produced, the edge remains inside the so-called segmentation zone. The cost of the pathways is given by means of a given equation, for example the Eikonal equation with possibly a speed dependent on the levels of gray in the segmentation. The propagation being able to take place in images in two or three dimensions in the state of the art, it is noteworthy to emphasize that the invention can also be used for flat images in two dimensions or spatial images in three dimensions. The propagation of the edge on the segmentation IMS is shown in FIG. 2 by dotted lines, the edge moving from the left, and therefore from the initial point, towards the right, passing through the successive positions illustrated by the dotted lines. Starting from the initial point, the edge is, for example, labeled by the value 1 and therefore denoted X[1]. The labeling of the edge uses knowledge well known to persons skilled in the art who know means for allocating a reference to an entity (here an edge) in order to locate it within an algorithm. The path extraction means TR thus include means LIB of labeling the edge. The path extraction means also include connectedness test means TES for the edge X which make it possible to detect whether the edge is connected, that is to say formed by a connected surface, or whether the edge consists of two or more connected surfaces. This connectedness test can be carried out in two or three dimensions according to the techniques relating to a connectedness test presented for example in the book: "Analyse d'images: filtrage et segmentation" by J. P. Coquerez, S. Philip, et al., published by Masson, 1995. The connectedness test takes place recursively with a function which is called itself and which refers back to the adjacent points. When the connectedness test is positive (case Y), the edge is connected. In the preferred embodiment of the invention, the labeling of the edges is modified, for example incremented by 1, even if the edge is still connected. This is the case in FIG. 2 where the connectedness test is carried out each time the edge has traveled a distance D. In this Figure, at the first test carried out when the edge has traveled a distance D from the initial point, the edge is detected as being connected. The distances covered (which are in reality weighted distances whenever the levels of gray are diverse within the segmentation) are advantageously calculated using a technique as disclosed in the article "Minimal paths in 3D images and application to virtual endoscopy", presented at the European Conference on Computer Vision, ECCV'00, Dublin, Ireland, 2000, by T. Deschamps and L. D. Cohen, which proposes a method for calculating a distance on an edge propagation path by fast marching. In FIG. 2, the edge is thus labeled X[2], until the following test. When the connectedness test is negative (case N), the edge is not connected and consists of several edge portions which it is then necessary to label differently in order to be able to distinguish them. In FIG. 2, it is the case of the edge labeled X[4] which is tested at a distance equal to four times the distance D from the initial point PI. The edge is here detected as being non-connected in its propagation within the segmentation IMS. This is because, in FIG. 2, it appears that the edge X[4] is divided in two at a distance equal to 4D from the initial point. The two portions of the edge are then labeled differently X[5] and X[6]. Thus, referring once again to FIG. 1, the path extraction means TR according to the invention include means LAB of labeling the labeling portions of the edge then labeled X[I'], X[I"], when a non-connected edge X[I] is detected. If a number of portions greater than two is detected, the same number of labels will be allocated to these portions. It is also possible to envisage that the edge portions are labeled by means of data other than figures. For example, letters or values which make it possible to store the labels of the antecedent edge portions in a memory, that is to say which have given rise to the edge being studied. It is also possible in another embodiment to leave the same value to the labeling of the edge until the connectedness test is negative, in which case the value of the labeling is modified, for example incremented by 1, for one of the detected edge portions and kept equal or also modified for another edge portion. Next the propagation of the edge continues until once again it has traveled the distance D. The value of the distance and the choice of this value are an important issue. It is possible to choose a distance D of the size of a dimension of a pixel or a voxel of the image. In this case, the connectedness test is carried out each time the edge corresponding to the size of a voxel advances. It is thus possible to choose a distance D ranging from the size of a pixel or voxel up to the maximum size of the object. However, in the preferred embodiment, the value of the distance D is chosen so as to be between these two extremes.

Such a choice makes it possible in fact to detect only the ramifications which have a length approximately greater than the value of the distance D. Thus the value of D is advantageously chosen so as to be slightly less than the smallest expected value for a ramification. Such a choice makes it possible not to detect the details of the object as being ramifications (which is not the case, incidentally, with the peeling algorithms). This smoothes the result to a certain extent, by excluding the detection of the ramifications less than a certain value, that is to say by limiting the search for ramifications to those with a size greater than the value of D. The invention thus makes it possible to obtain a detection of the ramifications which is precise and able to be changed according to the information which the user of the medical imaging station wishes to extract and analyze from the image. Thus the value of the distance D is advantageously offered as a modifiable parameter to the user. When the propagation of the edge takes place over all the points of the segmentation, identification means IDE identify final points PF of the propagation on ramifications which bear the labels allocated at the end of the ramification. It suffices for this for a table to be for example generated in order to record all the labels allocated with the labels which preceded them. In this table there are then sought the labels which do not have a successor. For each edge for which there is no succeeding label, there is then identified the point furthest away from the initial point. A technique as used in the patent of the state of the art can here advantageously be used for determining the point that is farthest away, for example by calculating maximum distances to the initial point using, for example, the method disclosed in the article cited above by T. Deschamps and L. D. Cohen.

In FIG. 2, the final points PF[7], PF[9] and PF[13] are defined by the greatest distance between the initial point PI and a point belonging to the edge bearing a label which does not possess a succeeding label. In FIG. 2, these edges are labeled: X[7], X[9] and X[13].

Finally, the path extraction means according to the invention include path tracing means TRA for tracing a path PAT from the final points PF and the initial point PI according to minimum path tracing techniques of the state of the art. This is illustrated in FIG. 3, which shows three paths PAT[7], PAT[9] and PAT[13] traced between the final points PF[7], PF[9] and PF[13] and the initial point PI.

Thus the invention makes it possible to detect and locate ramifications by detecting a loss of connectedness of an edge within the imaged object. From this detection, final points are identified. It is then possible to trace paths between two points according to the technique disclosed for example in the cited document of the state of the art. A minimum path can for example be traced between each final point and the initial point.

In the particular case of vessels, it is advantageous to obtain a path for each ramification between the initial point and the final point. It is then possible to be located within the vessel, which is very useful for surgical interventions in particular.

In another particularly advantageous embodiment of the invention, a single ramified path is traced. This embodiment uses means LOC of locating the fork point PE used within the path tracing means TRA itself. To trace the path PAT, the trace means TRA in general use minimum path tracing methods by step by step gradient descent from a final point to the initial point. The image is a Cartesian grid consisting of pixels in two dimensions and voxels in three dimensions. The trace thus obtained is subpixel or subvoxel. During the gradient descent which began at a given final point, all the pixels or voxels which have the traced path pass through them are then labeled by a label peculiar to the final point. The fork point location means define an "adjacent point" criterion. Two points are considered to be adjacent if the distance between them is less than a multiple, for example $\sqrt{2}$ in two dimensions or $\sqrt{3}$ in three dimensions, of the size of a dimension of a pixel or voxel. It is possible to choose a more or less refined "adjacent point" criterion by choosing more or less small multiples. This may be useful if it is wished to detect forks when the paths are still distant or on the contrary to detect them when they are very close. On the path during the gradient descent, the location means LOC test each pixel or voxel and their neighbors included in a surface or a volume defined by the value of the multiple. If a pixel or voxel adjacent to a point on the traced trajectory possesses the label of another final point, a path intersection is detected. When an intersection is detected, the label of the pixels or voxels through which the path passes during the subsequent gradient descent will be a new label marking the fork point. It is also possible to keep one of the labels of one of the final points whose paths have met. Referring to FIG. 3, the fork points PE are identified on the image and serve for tracing the trajectory by gradient descent subsequent to the location of the fork point until another fork or the initial point is met. A ramified path is finally constituted. The ramified trajectory according to a composite gradient descent finally consists of several minimum path portions between the file points and the fork points, PAT[F7], PAT[F9], PAT[F13] in FIG. 4, between the fork points PE[1] and PE[2] themselves, PAT[E1] in FIG. 1, and between the fork points and the initial point, PAT[E2] in FIG. 4, respectively. This ramified path enables the medical imaging station to have special functions. This is because it is then possible to selectively study a portion of a ramified structure without having to observe all the path. Thus, if an aneurysm is present on the ramification which has the final point PF[13], it will be easy to select a section calculation function solely on this part; likewise, if it is detected on the portion bearing the label of the fork point PE[1], the selection will thus take place on the portion between the fork points PE[1] and PE[2]. The location of an aneurysm is therefore more certain than when all the ramifications are observed, which may lead to section errors through the presence of undetected forks which may artificially enlarge this section.

The embodiments of the path tracing means presented may be used alone or in combination with each other. Thus it should be noted that the combination of two embodiments presented is particularly advantageous. This is because the combination of these two embodiments makes it possible to study multiple paths generated by the first embodiment for each ramification between one and the same initial point and final points peculiar to each ramification and a single ramified path which makes it possible to locate each ramification portion and to study the imaged object in its ramified structure and overall.

The invention also relates to a device for extracting a path intended to be used within a medical imaging station and a method of extracting a path intended to be used in a medical imaging station according to the invention.

A device for extracting a path according to the invention is intended to be coupled with segmentation means which supply to the device a segmentation of an image representing an imaged object in an image exhibiting levels of gray. Such a device can advantageously be used within a medical station as described above. In this regard, the extraction means TR shown in FIG. 1 constitute such a path extraction device according to the invention. Said device includes means of positioning on an initial point on the segmentation, means of propagating an edge within the segmentation from an initial point, means of testing the connectedness of the edge, means of labeling portions of the edge, referred to as ramifications, when an unconnected edge is detected, means of identifying final points of the propagation on ramifications, path tracing means for tracing a path between two given points of the image. These means are identical in their main characteristics to those used within the medical imaging station as described above.

A method of extracting a path according to the invention is intended to be coupled with a segmentation method which supplies to the extraction method a segmentation of an image representing an image object in an image exhibiting levels of gray. Such a method is intended to be used within a device for extracting a path as described above, or within a medical imaging station as described previously. Said method includes a step of positioning an initial point on the segmentation, a step of propagating an edge within the segmentation from the initial point, a step of testing the connectedness of the activated edge each time the edge has traveled a predetermined distance, a step of labeling portions of the edge, referred to as ramifications, when an unconnected edge is detected, a step of identifying final points of the propagation on ramifications, and a path tracing step for tracing a path between two given points of the image.

The use of a method according to the invention, and of a device according to the invention, of a medical imaging station according to the invention makes it possible to obtain a trace of multiple paths or of a ramified path in a very rapid and precise manner as soon as a segmentation is obtained for a ramified object. The display means can consequently display the path on an image or a segmentation depicted in two or three dimensions and possibly the change in the trace during the propagation of the edge.

There are many ways of implementing the functions presented in the means of the device and the steps of the method according to the invention by software and/or hardware means accessible to persons skilled in the art. This is why the Figures are schematic. Thus, although the Figures show various functions performed by various blocks, this does not exclude a single software and/or hardware means making it possible to perform several functions. Nor does this exclude a combination of software and/or hardware means making it possible to perform a function.

Although this invention has been described in accordance with the embodiments presented, a person skilled in the art will immediately recognize that there are variants to the embodiments presented, for example the means of automatic detection of an output of the propagation edge of the imaged object at a current point may use means of estimating the local speed of the edge at this point (for example by using distance measurements), the means of fixing the speed of the propagation at zero being activated for a local speed less than a speed threshold, and that these variants remain within the spirit and within the scope of the present invention.

The invention claimed is:

1. A medical imaging station including acquisition means for obtaining images exhibiting levels of gray, display means for displaying the images, segmentation means for segmenting at least one imaged object, said segmentation means determining a so-called segmentation zone delimiting the imaged object on the image, and path extraction means for extracting at least one path within the segmentation, wherein the extraction means include:

means of positioning an initial point on the segmentation, means of propagating an edge within the segmentation from the initial point, means of testing the connectedness of the edge, wherein the means of testing are activated each time the edge is propagated over a predetermined distance, means of labeling the portions of the edge, called ramifications, when an unconnected edge is detected, means of identifying final points of the propagation on the ramifications, path tracing means for tracing a path from the final points and the initial point.

2. A medical imaging station as claimed in claim 1, wherein a path is traced by the path tracing means between at least one final ramification point and the initial point.

3. A medical imaging station as claimed in claim 1, further comprising means of determining fork points between the ramifications.

4. A medical imaging station as claimed in claim 3, wherein the fork point determination means use a search on the voxels through which there passes a path traced by the path tracing means.

5. A medical imaging station as claimed in claim 3, wherein path portions are traced between the final points and the fork points, between the fork points and finally between the fork points and the initial points so as to obtain a ramified path.

6. A device for extracting a path intended to be coupled with segmentation means which supply to the device a segmentation of an image representing an imaged object in an image exhibiting levels of gray, said device further comprising:

means of positioning an initial point on the segmentation, means of propagating an edge within the segmentation from the initial point, means of testing the connectedness of the edge, wherein the means of testing are activated each time the edge is propagated over a predetermined distance means of labeling portions of the edge, referred to as ramifications, when a non-connected edge is detected, means of identifying final points of the propagation on the ramifications, path tracing means for tracing a path between two given points in the image.

7. A method of extracting a path intended to be coupled with a segmentation method which supplies to the extraction method a segmentation of an image representing an imaged object in an image exhibiting levels of gray, the method comprising:

positioning an initial point on the segmentation, propagating an edge within the segmentation from the initial point, testing the connectedness of the edge activated whenever the edge has traveled a predetermined distance, labeling portions of the edge, referred to as ramifications, when a non-connected edge is detected, identifying final points of the propagation on the ramifications, tracing a path between two given points in the image.

8. A computer program recorded on a computer readable medium having product comprising program code portions/means/instructions for executing steps of the method as claimed in claim 7 when said program is executed on a computer.

* * * * *